United States Patent [19]

Grimm et al.

[11] Patent Number: 5,072,793

[45] Date of Patent: Dec. 17, 1991

[54] TRIP ASSEMBLY

[75] Inventors: William L. Grimm, Wheaton; Charles E. Sheets, Naperville, both of Ill.

[73] Assignee: Case Corporation, Racine, Wis.

[21] Appl. No.: 561,837

[22] Filed: Aug. 2, 1990

[51] Int. Cl.$^5$ ............................................. A01B 61/04

[52] U.S. Cl. .................................. 172/266; 111/151; 172/261; 74/97.2

[58] Field of Search ...................... 172/261, 266, 269; 171/9; 111/151; 74/97.2

[56] References Cited

U.S. PATENT DOCUMENTS

| | | |
|---|---|---|
| 158,081 | 12/1874 | Hewett . |
| 310,821 | 1/1885 | Hench et al. . |
| 406,856 | 7/1889 | Sattley . |
| 407,780 | 7/1889 | Kissell . |
| 554,928 | 2/1896 | Ham . |
| 668,717 | 2/1901 | Rowell . |
| 722,690 | 3/1903 | Garst . |
| 1,224,025 | 4/1917 | Sanders . |
| 2,109,385 | 2/1938 | Garrison et al. . |
| 2,296,175 | 9/1942 | Morkoski . |
| 2,337,026 | 12/1943 | Cantral . |
| 2,679,792 | 6/1954 | Sheppard . |
| 2,690,111 | 9/1954 | Altgelt . |
| 2,747,486 | 5/1956 | Wilson . |
| 3,605,905 | 9/1971 | Bo . |
| 3,662,839 | 5/1972 | Thorsrud et al. . |
| 3,808,714 | 5/1974 | Reissinger et al. . |
| 3,910,354 | 10/1975 | Johnson et al. . |
| 3,972,374 | 8/1976 | Venable et al. . |
| 4,054,177 | 10/1977 | Quanbeck . |
| 4,068,723 | 1/1978 | Quanbeck . |
| 4,116,280 | 9/1978 | Rehn et al. . |
| 4,128,130 | 12/1978 | Green et al. . |
| 4,161,986 | 7/1979 | Ward . |
| 4,167,977 | 9/1979 | Geurts . |
| 4,210,212 | 7/1980 | Jackson et al. . |
| 4,236,583 | 12/1980 | Geurts ................................ 172/266 |
| 4,312,407 | 1/1982 | Crosby . |
| 4,312,408 | 1/1982 | Hansen . |
| 4,519,461 | 5/1985 | Harden et al. ....................... 172/266 |
| 4,609,051 | 9/1986 | Good . |

FOREIGN PATENT DOCUMENTS

| | | |
|---|---|---|
| 951951 | 7/1974 | Canada . |
| 1029593 | 4/1978 | Canada . |
| 1054426 | 5/1979 | Canada . |
| 1109721 | 9/1981 | Canada . |
| 1139600 | 1/1983 | Canada . |
| 2197500 | 3/1974 | France . |
| 2302015 | 9/1976 | France . |
| 2310690 | 12/1976 | France . |
| 2338632 | 8/1977 | France . |
| 2535935 | 5/1984 | France . |
| 2578140 | 9/1986 | France . |
| 2586889 | 3/1987 | France . |
| 2586890 | 3/1987 | France . |

OTHER PUBLICATIONS

2800 Semi-Integral Moldboard Plow, John Deere, Operator's Manual, Plow & Planter Works, OM-A38585 Issue B9 (1980).

Essais Officiels Du C.N.E.E.M.A., Huard advertisement (1974).

Primary Examiner—Randolph A. Reese
Assistant Examiner—Spencer Warnick
Attorney, Agent, or Firm—Dykema Gossett

[57] ABSTRACT

A trip assembly for a ground-working implement includes a rigid toggle member and a spring toggle member that are pinned, respectively, at a first point to a ground-engaging tool and at a second point to a frame. The rigid toggle member and the spring toggle member are pinned together at a third point that is a small distance vertically below a line extending between the first two points. A fulcrum from the rigid toggle member is in contact with the top of the spring toggle member at a central position. An obstruction force transmitted to the ground-engaging tool is transmitted to flex the spring toggle member vertically upwardly at the central position. As the spring toggle member flexes vertically upwardly, the third point moves upwardly through the small distance. Once the third point crosses the line between the first two points, the trip assembly trips and moves the ground-engaging tool to a vertically upwardly removed tripped position. The third point crosses the line once the obstruction force exceeds a trip load. The disclosed trip assembly is predictable in that it trips at relatively constant trip loads, regardless of the speed at which the ground-working implement is being moved through this ground.

11 Claims, 1 Drawing Sheet

TRIP ASSEMBLY

BACKGROUND OF THE INVENTION

The present invention relates to a trip assembly for moving a ground working implement to a tripped position when an obstruction applies a force to the implement that exceeds a preset trip load. More particularly, the present invention discloses a trip assembly that trips at predictable trip loads that are relatively insensitive to the speed at which the implement is moving.

Trip assemblies are well known and commonly utilized on plows. A known type of plow trip assembly includes two toggle members, one of which is pinned at a first point to the plow, and the other of which is pinned at a second point to a frame. The two toggle members are pinned to each other at a third point that is below a line extending through the first two points, and normally maintain the plow in a ground contacting plowing position. A force acting on the plow due to an obstruction in the ground, such as a stone, bends the third point upwardly until it crosses the line between the first and second points. When the third point crosses the line, the trip assembly trips and moves the plow to a tripped position removed from the ground.

Various types of two toggle member trip assemblies have been utilized, some of which use one relatively rigid toggle member and one relatively resilient spring toggle member. Prior art assemblies often bend the spring toggle member about a fulcrum, either between a frame and the spring toggle member, or between the spring toggle member and the rigid toggle member at a point above the center of the rigid toggle member.

Many prior art trip assemblies have problems since they may trip at forces that are below desired trip loads. In addition, most of these trip assemblies have unpredictable trip loads which are quite sensitive to the speed at which the plow is being moved through the ground. That is, the trip loads of many prior art systems vary widely as the speed of the plows varies.

Unpredictable trip assemblies may trip at trip loads that are lower than a desired trip load, resulting in undesirably frequent tripping. Each time a trip assembly trips and moves the plow to a tripped position, the operator must reset the plow to the plowing position. This is time-consuming, and thus an unpredictable, speed-sensitive plow trip assembly is undesirable.

SUMMARY OF THE INVENTION

It is an object of the present invention to develop a predictable trip assembly that trips a ground working implement, such as a moldboard plow, at a trip load that is relatively insensitive to the plow speed. In addition, it is an object of the present invention to have the trip load be at a level that is sufficiently high to be practically useful, and avoid tripping except when an obstruction is engaged. The present invention discloses a trip assembly with trip loads that are extremely constant regardless of changing plow speeds, and also high enough to be practically useful.

In an embodiment of the present invention, a plow is pinned to a frame and has a trip assembly comprising a rigid toggle member and a spring toggle member. One of the two toggle members is pinned at a first point to the standard of the plow, and the other toggle member is pinned at a second point to the frame. The rigid toggle member is pinned to the spring toggle member at a third point intermediate the first and second points. A line extending between the first and second points passes a small vertical distance, defined as an undercenter dimension, above the third point when the trip assembly is untripped. A fulcrum member extends from the rigid toggle member and is in contact with the top of the spring toggle member, approximately at a center position.

A force from an obstruction directed against the plow causes the center of the spring toggle member to flex upwardly against the fulcrum, such that the third point moves upwardly. If the third point crosses the line between the first two points, the trip assembly trips and the plow moves to a tripped position vertically removed from the ground.

In a preferred embodiment of the present invention, the rigid toggle member is pinned to the standard of the plow at the first point and the spring toggle member is pinned to the frame member at the second point. The top of the spring toggle member, which is in contact with the fulcrum, is vertically above a line extending from the third point to the second point by a small distance, defined as a spring offset. The spring offset determines the amount the spring toggle member must flex to move the third point upwardly through the line between the first and second point, and trip the trip assembly. It has been discovered that a relatively small spring offset, as will be described, has unexpected advantages relating to predictability of trip loads compared, for example, to the same configuration having a few millimeters greater spring offset.

In a most preferred embodiment of the present invention, the ratio of the spring offset to the length of the spring toggle member is 0.06. Preferably the spring offset is approximately 12 millimeters, the spring toggle member is approximately 200 millimeters long and the fulcrum contacts the approximate center of the spring toggle member. The undercenter dimension is preferably between 2.5 and 4.5 millimeters, and most preferably 3.0 millimeters.

As will be described, a trip assembly having a spring toggle member with the above dimensions exhibits unexpected insensitivity to the speed of the plow, and thus provides extremely predictable, relatively constant, trip loads.

These and other objects and features of the present invention can be best understood from the following specification and drawings, of which the following is a brief description.

DETAILED DESCRIPTION OF A PREFERRED EMBODIMENT

Figure 1:
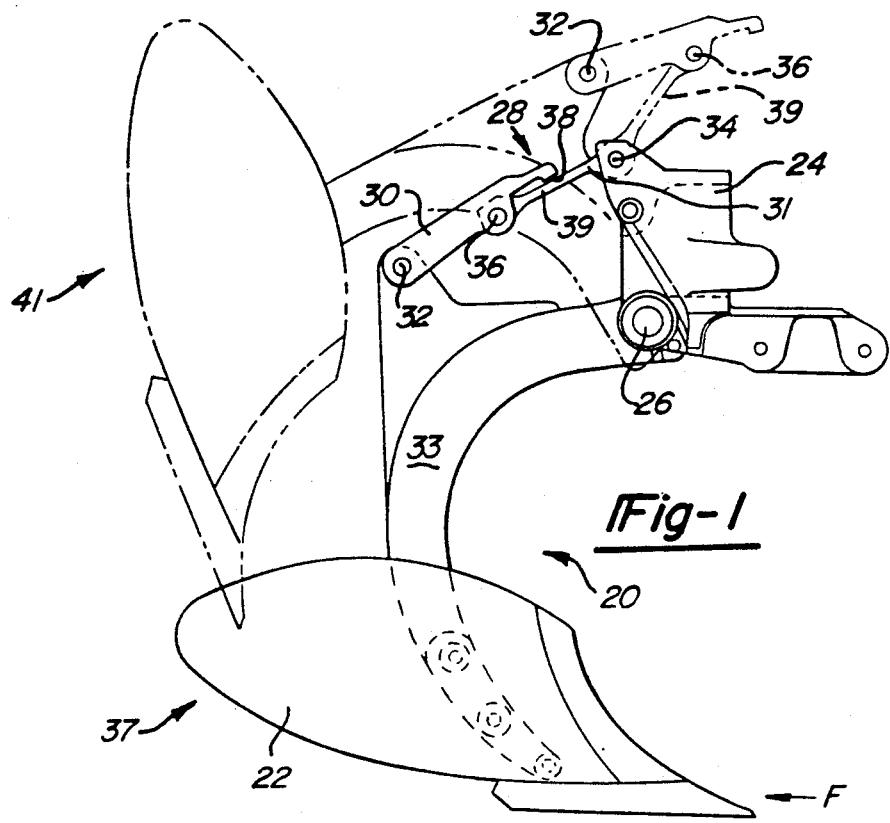
FIG. 1 is a view of the plow assembly in accordance with the present invention in both a plowing and a tripped position.

A plow assembly 20 is illustrated in FIG. 1 and includes plow 22 pinned at 26 to frame 24. Trip assembly 28 includes relatively rigid toggle member 30 and relatively resilient spring toggle member 31. Rigid toggle member 30 is preferably pinned at first point 32 to standard 33 of plow 22, while spring toggle member 31 is pinned at second point 34 to frame 24. Spring toggle member 31 is pinned to rigid toggle member 30 at third point 36. The two toggle members 30 and 31 normally maintain plow 22 in plowing position 37.

A line extending between first point 32 and second point 34 is vertically above third point 36 by a small distance, defined as an undercenter dimension, when plow 22 is in plowing position 37. If plow 22 encounters a stone or other obstruction, an obstruction force F is transmitted to plow 22. This force creates a column force inwardly from both first point 32 and second point 34, flexing web 39 of spring toggle member 31 upwardly against fulcrum 38, which tends to bend third point 36 upwardly. If third point 36 moves upwardly through the undercenter dimension such that it crosses the line between first point 32 and second point 34, trip assembly 28 trips. Plow assembly 20 then moves from plowing position 37 to tripped position 41, at which plow 22 is removed from the ground. The force required to move third point 36 to cross the line is defined as a trip load.

Figure 2:
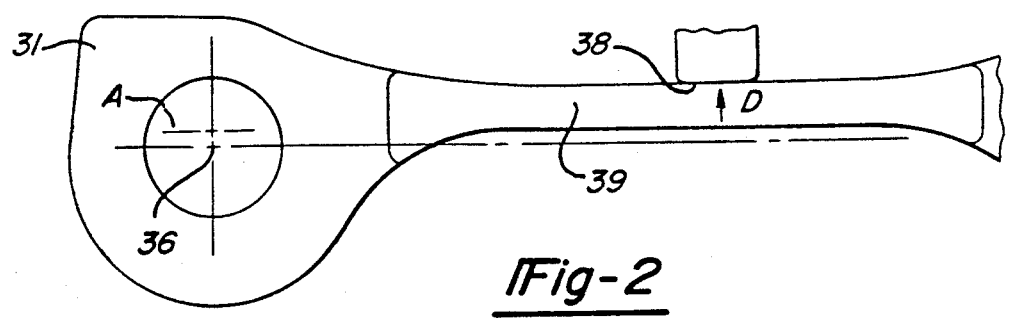
FIG. 2 is an enlarged partial view showing the contact between the members of the trip assembly.

As shown in FIG. 2, force D flexes web 39 of spring toggle member 31 upwardly against fulcrum 38, which resists this flexing. Third point 36 is illustrated a small vertical distance, or undercenter dimension, below line A which extends between first point 32 and second point 34. The flexing of spring toggle member 31 against fulcrum 38 forces third point 36 upwardly. Once third point 36 has been forced upwardly to cross line A, trip assembly 28 trips and moves plow 22 to tripped position 41.

Figure 3:
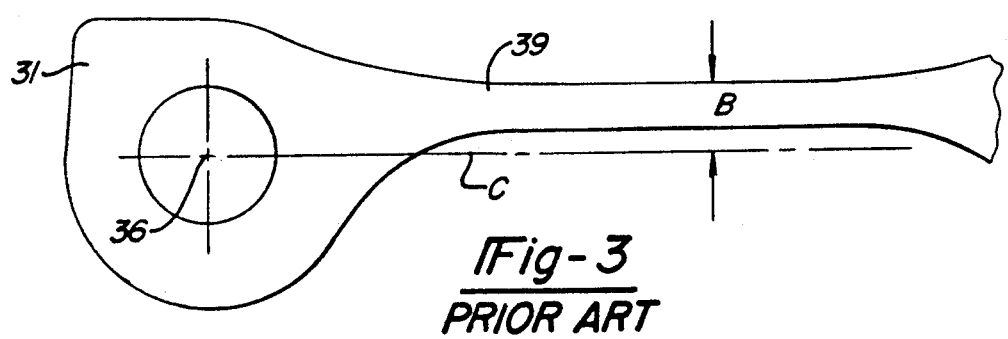
FIG. 3 is an enlarged partial view showing a spring toggle member as disclosed by the present invention.

As illustrated in FIG. 3, the contact point between the fulcrum and web 39 is at the top of web 39 a spring offset B above a Line C, which extends between second point 34 and third point 36. Spring offset B has been discovered to be an important variable in designing trip assembly 28.

In a most preferred embodiment of the present invention, spring offset B is approximately 12 millimeters, and the length of spring toggle member 31 between points 36 and 34 is approximately 200 millimeters. Thus, the ratio of the spring offset to the length of spring toggle member 31 is preferably 0.06. The undercenter dimension is preferably between 2.5 millimeters and 4.5 millimeters, and most preferably about 3.0 millimeters. The bottom of web 39 is 3 millimeters above line C. The thickness of web 39 is 9 millimeters, with allowable tolerances between 8.9 and 9.55 millimeters.

Test results have shown a trip assembly 28 having a spring toggle member of the above dimensions exhibits trip loads that are extremely insensitive to speed. The insensitivity to speed of the trip loads exhibited by a trip assembly having a spring toggle member with the most preferred dimensions are quite unexpected, and the resulting trip assembly 28 provides very predictable trip loads. These tests results are summarized below.

TRIP LOAD TEST RESULTS

Various 200 millimeter long spring toggle members 31 were tested in plow assemblies 20 to determine trip loads across a speed range of 1.6 kilometers per hour to 6.7 kilometers per hour. Each toggle member was tested on three runs at each speed. The trip load values given below are average values for the three runs.

A first tested spring toggle member had a 15 millimeter spring offset, and a 3.2 millimeter undercenter dimension. At 1.6 kilometers per hour plow speed, a trip assembly with this first spring toggle member had a trip load of 2,318 kilograms; at 4.2 kilometers per hour, a trip load of 2,250 kilograms; and at 6.7 kilometers per hour, a trip load of 2,955 kilograms. With this first spring toggle member, there was a 31% difference in trip loads exhibited across the tested speed range.

A second tested spring toggle member had a 15 millimeter spring offset, and 3.9 millimeter undercenter dimension. At 1.6 kilometers per hour plow speed, the trip load was 2,682 kilograms; at 4.2 kilometers per hour, the trip load was 2,545 kilograms; at 6.7 kilometers per hour, the trip load was 3,091 kilograms. With this second spring toggle member there was a 21% difference in trip loads exhibited across the tested speed range.

A third tested spring toggle member having a 12 millimeter spring offset, and a 1.8 millimeter undercenter dimension was tested. The trip loads exhibited with this spring toggle member were too low for the trip assembly to be practically utilized.

A fourth tested spring toggle member had a 12 millimeter spring offset, and a 2.8 millimeter undercenter dimension. At 1.6 kilometers per hour the trip load was 2,864 kilograms; at 4.2 kilometers per hour the trip load was 2,886 kilograms; and at 6.7 kilometers per hour the trip load was 2,955 kilograms. With this spring toggle member, only a 3% difference in trip loads was exhibited across the tested speed range.

A fifth tested spring toggle member also had a 12 millimeter spring offset, and had a 4.2 millimeter undercenter dimension. At 1.6 kilometers per hour the trip load was 3,341 kilograms; at 4.2 kilometers per hour the trip load was 3,591 kilograms; and at 6.7 kilometers per hour the trip load was 3,455 kilograms. With this spring toggle member, only a 7% difference in trip loads was exhibited across the tested speed range.

SUMMARY

The fourth and fifth spring toggle members, with 12 millimeter spring offsets, unexpectedly had extremely constant trip loads across the speed range tested. The 12 millimeter spring offset spring toggle members, having trip load differences of 3% or 7%, were surprisingly speed-insensitive compared to the 15 millimeter spring offset spring toggle members. The 15 millimeter spring offset spring toggle members had trip load differences of 31% or 21%, as much as ten times the difference exhibited by a 12 millimeter spring offset spring toggle member. The fourth and fifth spring toggle member trip loads are also quite insensitive to speed compared to several prior art trip assemblies.

The speed of a plow assembly typically varies between 1.5 kilometers per hour to over 8 kilometers per hour, and it is important that the trip assembly be as insensitive to speed as possible within this speed range. Thus, it is desirable that the trip load differences be as small as possible across this speed range. This would insure that the trip assembly does not trip at trip loads that are lower or higher then a desired trip load. The fourth and fifth spring toggle members unexpectedly achieve this goal.

The unexpected results experienced with the 12 millimeter spring offset may be due to the fact that a smaller spring offset limits the extent of web 39 deflection, and minimizes the required rotation about the pin joints at points 32, 34 and 36. This may reduce any variability introduced by joint friction and sticking, or slipping, during pin rotation.

The tested trip assembly had first point 32 positioned vertically lower with respect to second point 34 than the illustrated preferred trip assembly 28. The above preferred dimensions of spring toggle member 31 provide the same unexpected results in the illustrated trip assembly. As the vertical position of first point 32 is moved upwardly to approach the vertical position of second point 34, and the untripped to assembly 28 becomes more horizontal, the stress in spring toggle member 31 is reduced. This stress reduction increases spring life.

Relatively rigid toggle member 30 is preferably formed as a rigid steel casting, while relatively resilient spring toggle member 31 may be forged from steel grades 15B41H, 4140H, 4145H, 4150H or 5160H. Steel grades Case MS 396 or 450 may also be used. The spring toggle member is heat treated and tempered at 288 degrees C. The resulting minimum core hardness is RC46.

Although a moldboard plow is illustrated, it should be understood that other types of ground-engaging tools could incorporate trip assembly 28. Trip assembly 28 could be utilized with chisel plows, disc plows, subsoilers or any ground-working, tillage or cultivator implement that is to break away or trip from an obstruction.

A preferred embodiment of the present invention has been disclosed, however, a worker in the art would realize that certain modifications may fall within the scope of this invention and thus the following claims should be studied in order to determine the true scope and content of the present invention.

We claim:

1. A ground-working implement comprising:
   a ground-engaging tool pivotally connected to a frame;
   a trip assembly normally maintaining said ground-engaging tool at a plowing position and comprising a relatively rigid toggle member and a relatively resilient spring toggle member, said rigid toggle member being pinned to said ground-engaging tool at a first point, said spring toggle member being pinned to said frame at a second point, said rigid toggle member having a fulcrum member in contact with said spring toggle member at a contact position vertically above said spring toggle member, said rigid toggle member being pinned to said spring toggle member at a third point, said third point being an undercenter dimension vertically below a line drawn between said first and second points, a force applied to said ground-engaging tool being transmitted to flex said spring toggle member vertically upwardly into said fulcrum member at said contact position, and in turn forcing said third point vertically upwardly, said trip assembly tripping and causing said ground-engaging tool to be moved vertically upwardly to a tripped position when said third point has moved upwardly through said undercenter dimension and crosses said line between said first and second points, the tripping of said trip assembly causing said rigid toggle member to pivot vertically upwardly about said first point and said spring toggle member to pivot vertically upwardly about said second point; and
   a second line is defined extending between said second and third points, said contact position being a distance defined as a spring offset above said second line, the ratio of said spring offset to the length of the spring toggle measured along said second line between the second and third points is equal to, or less than 0.06.

2. A ground-working implement as recited in claim 1, wherein said contact position is approximately in the center of said spring toggle member.

3. A ground-working implement as recited in claim 1, wherein said ratio is 0.06.

4. A ground-working implement as recited in claim 1, wherein the length of said spring toggle between said second and third points is approximately 200 millimeters.

5. A ground-working implement as recited in claim 1, wherein said undercenter dimension is between 2.8 millimeters and 4.2 millimeters.

6. A ground-working implement comprising:
   a ground-engaging tool pivotally connected to a frame;
   a trip assembly normally maintaining said ground-engaging tool at a plowing position and comprising a relatively rigid toggle member and a relatively resilient spring toggle member, said rigid toggle member being pinned to said ground-engaging tool at a first point, said spring toggle member being pinned to said frame at a second point, said rigid toggle member having a fulcrum member in contact with said spring toggle member at a contact position vertically above said spring toggle member, said rigid toggle member being pinned to said spring toggle member at a third point, said third point being an undercenter dimension vertically below a line drawn between said first and second points, a force applied to said ground-engaging tool being transmitted to flex said spring toggle member vertically upwardly into said fulcrum member at said contact position, and in turn forcing said third point vertically upwardly, said trip assembly tripping and causing said ground-engaging tool to be moved vertically upwardly to a tripped position when said third point has moved upwardly through said undercenter dimension and crosses said line between said first and second points, the tripping of said trip assembly causing said rigid toggle member to pivot vertically upwardly about said first point and said spring toggle member to pivot vertically upwardly about said second point; and
   a second line is defined extending between said second and third points, said contact position being a distance equal to, or less than 12 millimeters above said second line.

7. A ground-working implement as recited in claim 6, wherein the length of said spring toggle member between said second and third points is 200 millimeters.

8. A ground-working implement as recited in claim 7, wherein said contact position is approximately in the center of said spring toggle member.

9. A ground-working implement as recited in claim 8, wherein said undercenter dimension is between 2.8 millimeters and 4.2 millimeters.

10. A ground-working implement as recited in claim 6, wherein a second line is defined extending between said second and third points, said contact position being a distance defined as a spring offset above said second line, the ratio of said spring offset to the length of the spring toggle measured along said second line between the second and third points is 0.06.

11. A ground-working implement as recited in claim 6, wherein said contact position is 12 millimeters above said second line.

* * * * *